Patented Nov. 27, 1928.

1,693,488

UNITED STATES PATENT OFFICE.

JOHN MAYES, OF PORT AUSTIN, MICHIGAN, ASSIGNOR TO MAYES BROTHERS TOOL MANUFACTURING COMPANY, OF PORT AUSTIN, MICHIGAN, A CORPORATION OF MICHIGAN.

CEMENTING COMPOUND.

No Drawing. Application filed March 10, 1927. Serial No. 174,412.

My invention consists in a compound for use in cementing in place the "vials" used in the construction of levels, the object being to provide such a compound or plaster that will be of permanent character, very efficient in use, and at the same time comparatively inexpensive.

In making said compound I take sixteen (16) ounces of #1 moulding plaster, two (2) ounces of dry litharge, and add enough water to make a paste of a consistency suitable for the purpose. In use this mixture or compound is applied to the ends of the vials or in the seats in the level in which the vials are mounted, said vials being adjusted to their permanent position in said seats; the cement soon hardens and fixes the vials solidly in position. The object of adding litharge to the molding plaster is to render the product somewhat more plastic and to render the composition more impervious to moisture.

The substance which I refer to as "moulding" plaster is also known as "plaster Paris", "casting plaster" and sometimes "stucco".

While the proportions above stated have been found to produce a satisfactory compound for the purpose, it will be understood, of course, that I do not wish to be limited to the exact proportions as some variation therefrom can be made without materially impairing the value of the compound for the purpose, and I therefore do not wish to be understood as limiting the invention except as required by the scope of the claim.

Having thus fully described my said invention, what I claim as new and desire to secure by Letters Patent, is:

A compound capable of forming a quick-setting cement when combined with water consisting of molding plaster and litharge in the proportions of approximately eight to one, respectively, substantially as set forth.

In witness whereof, I have hereunto set my hand at Port Austin, Michigan, this 26th day of February, A. D. nineteen hundred and twenty-seven.

JOHN MAYES.